United States Patent [19]

Wilcox

[11] Patent Number: 5,072,755
[45] Date of Patent: Dec. 17, 1991

[54] QUICK DISCONNECT COUPLING

[75] Inventor: Wayne E. Wilcox, Union City, Pa.

[73] Assignee: Snap-Tite, Inc., Erie, Pa.

[21] Appl. No.: 538,147

[22] Filed: Jun. 14, 1990

[51] Int. Cl.$^5$ .................................................. F16L 29/00
[52] U.S. Cl. ............................... 137/614.03; 137/614.05
[58] Field of Search ............. 137/614, 614.03, 614.05, 137/614.06

[56] References Cited

U.S. PATENT DOCUMENTS

| 2,471,237 | 5/1949 | Pasturczak . | |
|---|---|---|---|
| 2,553,680 | 5/1951 | Scheiner | 137/614.03 X |
| 2,714,518 | 8/1955 | Balass | 137/614.03 |
| 2,753,195 | 7/1956 | Palmer | 137/614.03 |
| 3,613,726 | 10/1971 | Torres | 137/614.03 |
| 4,285,364 | 8/1981 | Hauber | 137/614.03 |
| 4,768,538 | 9/1988 | Mintz et al. | 137/614.04 X |
| 4,832,080 | 5/1989 | Smith . | |

Primary Examiner—John C. Fox
Attorney, Agent, or Firm—Woodling, Krost & Rust

[57] ABSTRACT

A high reliability undersea coupling design which employs only metal seals, and in which forces from high internal pressure are balanced so that these pressures do not tend to cause uncoupling.

5 Claims, 3 Drawing Sheets

QUICK DISCONNECT COUPLING

The present invention relates to high reliability subsea couplers for hydraulic fluid lines. In particular, it relates to such couplers which have metal seals to prevent the escape of hydraulic fluid.

BACKGROUND OF THE INVENTION

In undersea fluid pressure transmission lines, as for petroleum operations, high reliability is very important. Typically a number of coupler halves are mounted perpendicularly to a plate or mounting base, with the mating half of each coupler mounted on one or more parallel opposing plates, so that all couplings mate at the same time. Metal-to-metal seals are preferably used for reliability and strength. Examples of such couplers are seen in U.S. Pat. Nos. 4,637,470 to Weathers et al., 4,694,859 to Smith and 4,709,726 to Fitzgibbons. Typically the metal seal will be C-shaped, as in the Smith and Fitzgibbons patents, or V-shaped as in the Weathers connector design.

A coupling arrangement is needed in which the high internal pressure will not tend to cause uncoupling. This will permit the mounting plates, and the means holding the couplers together, to be of lighter construction and will lessen the possibility of mishap. It is for this purpose that the present invention has been made.

SUMMARY OF THE INVENTION

In the present invention, a fluid passage is provided in each coupling half. A sliding valve assembly covers a port of each passage, distal to the fluid source. These ports coincide when the coupler is connected, at which position the valve assemblies are retracted. Sealing between the ports and the environment is accomplished by metal seals on both sides of each port. Because the seal arrangement is balanced, and because of the passage design, the system pressure does not cause a high separation force.

An object of the present invention is to provide a coupler with high reliability and full connectability and disconnectability, with internal working pressure, under water.

Another object of the invention is to provide such a connector in which the internal pressure does not create a net force tending to cause uncoupling.

DETAILED DESCRIPTION OF A PREFERRED EMBODIMENT OF THE INVENTION

Figure 1:
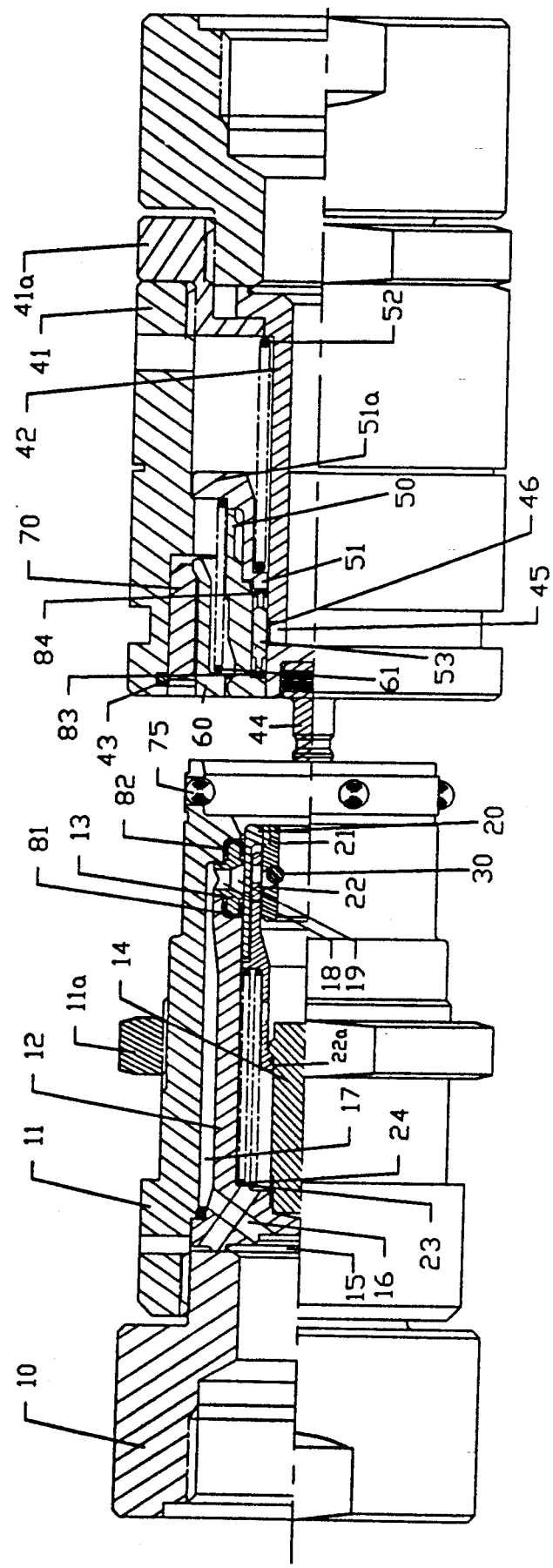
FIG. 1 is a lengthwise view, shown above the center line in section and below as an elevation, of a preferred embodiment of the coupler of the present invention before connection.

In FIG. 1, the presently preferred embodiment of the coupler is shown before connection, and in FIGS. 2 and 3 the partially connected and fully connected coupler, respectively.

In the left or "coupler" assembly half, there are three groups of generally cylindrical components, each group moving essentially as a unit and performing its function cooperatively. It will be understood by one skilled in the art that there will be equivalent configurations which could be used to perform the functions as described. On the extreme left is a coupler adapter 10 which connects the coupler assembly to a left-hand fluid source. A coupler body 11 is connected to it, preferably by screw threads. In some applications a nut 11a is threaded to the coupler body 11 for connection to the plates or other system components. Near the right end of coupler body 11 a plurality of balls 75 are crimped into circumferentially disposed holes such that each one may move radially sufficiently for locking the coupler halves together in a manner to be described, but may not move appreciably either axially or circumferentially. Radially inside coupler body 11 is a pintle 12. A flow ring 13 is interposed between pintle 12 and coupler body 11, and a stem 14 is threaded into pintle 12 in the center of the coupler half. As will be seen from the drawing, pintle 12, flow ring 13 and stem 14 interfit with coupler adapter 10 and coupler body 11 so that all "move together" (in practice, they are stationary) as one unit. This unit, which may be called the coupler body, serves primarily to provide a passage for the fluid to and from the left hand fluid source or destination. This passage consists of a left coupler port 15, a duct or ducts 16 in pintle 12, a cylindrical section 17 between pintle 12 and coupler body 11, and a plurality of ducts 18 arranged around the circumference of flow ring 13, ending at right coupler port 19.

The other principal functions of the coupler body assembly are to lock itself into the nipple body assembly and to leftwardly retract the nipple valve assembly and mud sleeve, as will be described later.

The coupler body also serves to provide support for the various other components, springs and seals to be mentioned, and has additional ducts connecting the outside (seawater) environment with its interior portions. It should be noted that the seawater duct or ducts in pintle 12 are offset from the fluid duct or ducts 16 and not connected with it or them.

Figure 2:
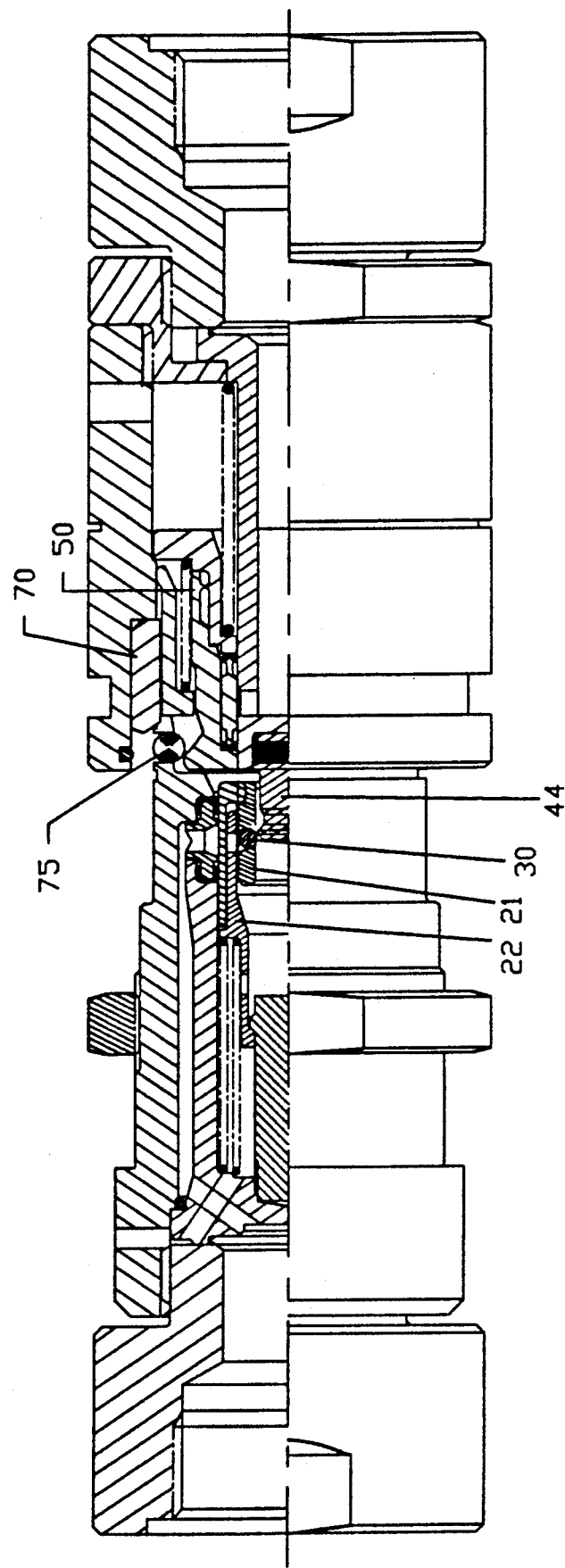
FIG. 2 is a similar lengthwise view of the coupler seen in FIG. 1, but as partially connected.

In the uncoupled state (as seen in FIGS. 1 and 2), right coupler port 19 is covered by a generally sleeve-shaped valve 20 which is threaded to a pin retainer 21. These two components thus move together as a single unit which may be called the valve assembly. Pin retainer 21 is another sleeve located radially inward from valve 20 but there is a space between them which is occupied by the rightmost portion of another component, a retractor 22. The leftmost portion of retractor 22 has a shoulder 22a adapted to engage an opposed shoulder on stem 14 so that rightward movement of the retractor 22, which is urged by first and second retractor springs 23 and 24, respectively, is limited as seen in FIGS. 1 and 2.

Although axial motion of retractor 22 with respect to the valve assembly (i.e., valve 20 and pin retainer 21) is possible, such motion is greatly limited by an interactive arrangement now to be described. It will be noted that retractor 22 and pin retainer 21 are concentric sleeves making sliding contact. A pair of pins, the upper one seen in section as 30, extend in the length of slots in both retractor 22 and pin retainer 21. The ends of pin 30 occupy the ends of the slot in retractor 22 while the center portion of pin 30 occupies the slot in pin retainer 21. The latter slot has sidewalls at an angle to the radius of the sleeves, as seen in the Figures, so that pin 30 is permitted to shift slightly outwardly and leftwardly when urged leftwardly from below. For ease of assembly retractor 22 and pin retainer 21 are preferably kept from rotating about the axis of the coupling with respect to each other by a small slug pin, parallel to the axis and not shown in section, which keys them together.

The valve assembly thus serves essentially two functions: on the outside, it seals off right coupler port 19, by contact of valve 20 with the metal seals to be described, and on the inside it provides a means for locking itself, via pin 30, onto a probe 44 affixed to the nipple half, to be described. FIG. 2 shows the configuration at the point of either connection or disconnection at which the pin rises in response to the probe. It can be seen that because of the angle of the sidewalls of the slot in pin retainer 21, it is very much easier to connect probe 44 than to disconnect it.

Figure 3:
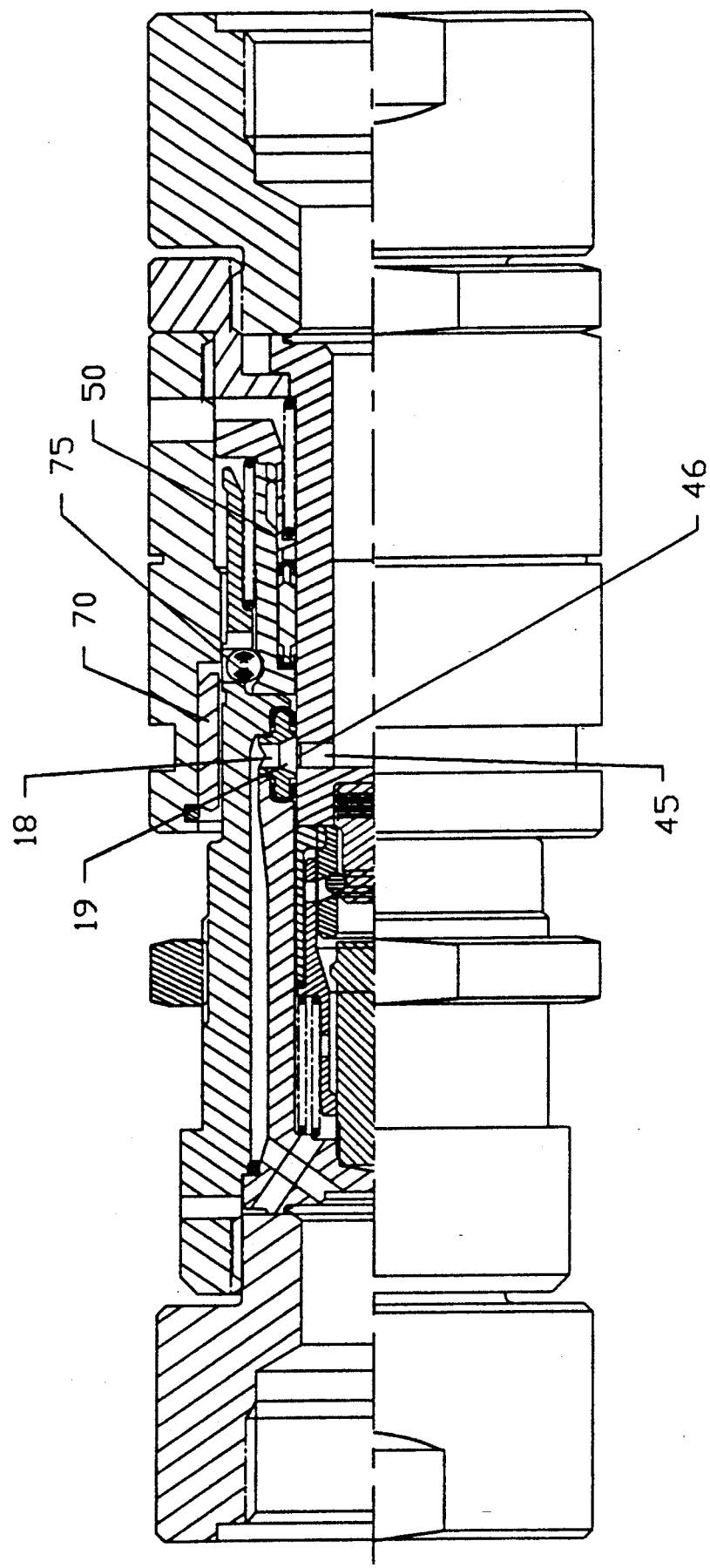
FIG. 3 is a similar lengthwise view of the same coupler, as connected.

The right or "nipple" assembly half of the coupler has four groups of cooperating components. The first one, or nipple body assembly, consists in the preferred embodiment of a nipple adapter 40, a nipple body 41 screw-threaded via a nipple retainer 41a to it, a nipple 42 interfitting between the nipple retainer 41a and the nipple adapter 40,, a ball race retaining ring 43, and a probe 44. The nipple body assembly, all of components of which are stationary with respect to each other, serves the same functions as the coupler body already described. In particular, it has a right fluid source, which is connected by a ring of ducts 45 to a nipple port 46. As seen in FIG. 3, the right coupler port 19 and nipple port 46 are located so as to be in communication when the coupler is connected. The nipple body assembly also serves to rightwardly retract the coupler valve assembly by contact with nipple valve 42 and probe 44, and by virtue of the locking of the pin 30 onto probe 44, as uncoupling occurs the coupler valve assembly will be positively drawn rightwardly in spite of the great friction of the metal seals around the flow ring 13. As will be seen in all Figures, the nipple body assembly is provided with ducting connecting the outside environment with its interior, similarly to the coupler body. This ducting is of course to permit the retraction and extension of the valve assemblies.

Also analogously to the left half, the nipple assembly has a nipple valve assembly covering nipple ducts 45 in the uncoupled mode. It comprises a nipple valve 50 threaded to a nipple seal retainer 51 which is urged leftward by a nipple valve spring 52, and a nipple seal spacer 53 interfitting between valve 50 and retainer 51 to hold in place C-shaped metal seals which contact nipple 42 on both sides of ducts 45. The nipple valve assembly is retained at the end of its leftward travel by a nipple retainer shoulder 51a.

The remaining two component assemblies in the nipple half are a mud sleeve assembly, comprising mud sleeve 60 urged leftward by a mud sleeve spring 61, and a ball race 70. Ball race 70 is a sleeve with a tapered shoulder on each of its front (left) and rear (right) edges. It "floats", or moves freely axially, in a small region between ball race retaining ring 43 and a shoulder on nipple body 41, except that in the uncoupled mode (FIG. 1) it is also urged leftwardly by mud sleeve spring 61 because of cooperating wall means on the right ends of it and mud sleeve 60. These means also limit the leftward travel of mud sleeve 60.

Various metal seals are provided. The most important ones are a first through fourth metal seal, 81 through 84 respectively, one located on each side of right coupler port 19 and nipple port 46. In the preferred embodiment these are circular and C-shaped in cross section, but it will be clear to those skilled in the art that other shapes may be employed. The diameters of these seals on each side of any pressure source are identical, so there is no net separation force tending to separate the coupler.

When the coupler halves are abutted and pushed together, as seen in FIG. 3, the nipple valve assembly retracts rightwardly, the coupler valve assembly in the left half retracts leftwardly, and the respective body halves interfit to juxtapose the fluid ports 19 and 46. In prior art couplings with only metal seals, the seals are generally stationary ones. However in my design the ports in the respective halves are covered in the disconnected mode, as seen above, by sliding sleeve-type valves, and metal seals are used between the valve and the port-bearing members to seal each port. But these seals must also slide along a member. Since the friction of metal seals is considerably greater than that of elastomeric ones, special provision is made to lock the valve in each half firmly into a portion of the opposing half so that upon disconnection the valve is pulled back over its port. In particular, the probe 44 locks onto pin 30 to pull the coupler valve assembly back, and the balls 75 lock into nipple valve 50 to pull it back. The latter construction is similar to that disclosed in my U.S. Pat. No. 4,924,909, issued May 15, 1990, but it contains an improvement, now to be discussed, for undersea use.

An important feature of the coupler design is the fact that the ball race 70, as already mentioned, "floats" so that axial movement is permitted. As seen best in FIG. 3, balls 75 engage a shallow groove in nipple valve 50 upon connection, so that when disconnection is occurring, nipple valve 50 is positively pulled leftward. At the same time, friction of the balls 75 on ball race 70 urges it also leftwardly. At the precise point of disconnection, the balls 75 reach the tapered sidewall of ball race 70 and are able to spring outward. It is important that this does not occur until valve 50 has been pulled fully leftward, so just before the balls release valve 50, ball race 70 must be in its leftmost position. In springing up, the balls cause ball race 70 to recoil backward, as it appears in FIG. 2. If this backward recoil could not occur, the clearance for re-entry of the balls 75 upon subsequent recoupling would be very narrow. Any foreign matter, such as sand, that had drifted onto the coupling would make it difficult or impossible to recouple without damage to the coupler.

Because of the design of the opposed metal seals and the fluid passages in the closed coupling, there is no net separation force on the passage walls tending to separate the coupling as there is in most of the prior art designs. The only wall surfaces of a moving member exposed to internal pressure are the cylindrical valve sleeve surfaces, against which pressure is directed radially, not axially, and the interior of the metal seals, which as seen result in equal and oppositely directed forces.

The invention has been described in detail with particular emphasis on the preferred embodiments thereof, but it should be understood that variations and modifications within the spirit and scope of the invention may occur to those skilled in the art to which the invention pertains.

What is claimed is:

1. A coupling comprising
  a coupling half with a coupler fluid port in a coupler port bearing member, a coupler valve sliding over said port, first and second metal seals on opposite sides of said coupler port, said metal seals sealing between said coupler port bearing member and said coupler valve;

a nipple half with a nipple fluid port in a nipple port bearing member, a nipple valve sliding over said port, third and fourth metal seals on opposite sides of said nipple port, said metal seals sealing between said nipple port bearing member and said nipple valve;

said coupler and nipple valves being retracted in the connected mode and said coupler and nipple ports being in communication; and locking means between said nipple half and said coupler valve, said locking means tending to insure that said coupler valve is returned to a sealing position over its port upon disconnection of said coupling.

2. A coupling comprising a coupling half with a coupler fluid port in a coupler port bearing member, a coupler valve sliding over said port, first and second metal seals on opposite sides of said coupler port, said metal seals sealing between said coupler port bearing member and said coupler valve;

a nipple half with a nipple fluid port in a nipple port bearing member, a nipple valve sliding over said port, third and fourth metal seals on opposite sides of said nipple port, said metal seals sealing between said nipple port bearing member and said nipple valve;

said coupler and nipple valves being retracted in the connected mode and said coupler and nipple ports being in communication;

first locking means between said nipple half and said coupler valve, said first locking means tending to insure that said coupler valve is returned to a sealing position over its port upon disconnection of said coupling; and second locking means between said coupler half and said nipple valve, said second locking means tending to insure that said nipple valve is returned to a sealing position over its port upon disconnection of said coupling.

3. A coupling comprising a coupling half with a coupler fluid port in a coupler port bearing member, a coupler valve sliding over said port and movable between open and closed positions, first and second metal seals on opposite sides of said coupler port, a first spacer member between said first and second metal seals and maintaining said first and second metal seals in spaced relationship, said metal seals sealing between said coupler port bearing member and said coupler valve;

a nipple half with a nipple fluid port in a nipple port bearing member, a nipple valve sliding over said port and movable between open and closed positions, third and fourth metal seals on opposite sides of said nipple port, a second spacer member between said third and fourth metal seals and maintaining said third and fourth metal seals in spaced relationship, said metal seals sealing between said nipple port bearing member and said nipple valve; and said coupler and nipple valves being retracted in the connected mode and said coupler and nipple ports being in communication.

4. The coupling of claim 3 in which said metal seals are generally C-shaped in cross-section which defines an open end portion, said open end portion of said first and second metal seals facing each other and said coupler fluid port in at least one of said open and closed positions of said coupler valve, said open end portion of said third and fourth metal seals facing each other and said nipple port in at least one of said open and closed positions of said nipple valve.

5. The coupling of claim 4 wherein said open end portion of said first and second metal seals face said coupler port in all positions of said coupler valve, said open end portions of said third and fourth metal seals face said nipple port only in the closed position of said nipple valve.

* * * * *